United States Patent
Upadhya

(10) Patent No.: US 12,199,707 B2
(45) Date of Patent: Jan. 14, 2025

(54) MIMO ANTENNAS

(71) Applicant: Nokia Solutions and Networks Oy, Espoo (FI)

(72) Inventor: Karthik Upadhya, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 191 days.

(21) Appl. No.: 18/093,368

(22) Filed: Jan. 5, 2023

(65) Prior Publication Data

US 2023/0216555 A1 Jul. 6, 2023

(30) Foreign Application Priority Data

Jan. 5, 2022 (FI) .................................... 20225004

(51) Int. Cl.
*H04B 7/0456* (2017.01)
*H01Q 21/06* (2006.01)
*H01Q 23/00* (2006.01)

(52) U.S. Cl.
CPC ......... *H04B 7/0465* (2013.01); *H01Q 21/061* (2013.01); *H01Q 23/00* (2013.01)

(58) Field of Classification Search
CPC .. H04B 7/0613; H04B 7/0465; H01Q 21/061; H04L 25/03343; H04L 25/03891
See application file for complete search history.

(56) References Cited

U.S. PATENT DOCUMENTS

| | | | |
|---|---|---|---|
| 5,861,226 A | 1/1999 | Horne et al. | 430/5 |
| 2004/0087281 A1* | 5/2004 | Ylitalo | H04B 7/0848 |
| | | | 455/25 |
| 2017/0338842 A1* | 11/2017 | Pratt | H03F 1/3294 |
| 2018/0316367 A1* | 11/2018 | Johansson | H04B 1/0475 |
| 2018/0351587 A1* | 12/2018 | Nammi | H04B 1/0475 |
| 2022/0085833 A1* | 3/2022 | Upadhya | H04B 1/0475 |

FOREIGN PATENT DOCUMENTS

WO WO-2014/054043 A1 4/2014

OTHER PUBLICATIONS

Karthik Upadhyay, Stefan Wesemann, "Nonlinear Precoding for Quantized Outphasing RF Chains in Massive MIMO Systems", 2021 IEEE 93rd Vehicular Technology Conference (VTC2021-Spring), Jun. 15, 2021 (Year: 2021).*

(Continued)

*Primary Examiner* — Aristocratis Fotakis
(74) *Attorney, Agent, or Firm* — Harrington & Smith

(57) ABSTRACT

Antenna arrays to be used in MIMO apparatuses are disclosed. Such an antenna array may include a plurality of array elements, wherein every second element in a first direction is a digital pre-distortion-less linear element, and every second element in the first direction is a non-linear element. In the antenna array, spacing between adjacent elements in the first direction is less than a half of a free space wavelength. A non-linear precoding is applied to transmissions from the antenna array, the non-linear precoding converting out-of-band emissions of the transmissions into reactive power in the near-field around the antenna array while ensuring that in-band signals generated by the elements remain unaffected.

12 Claims, 4 Drawing Sheets

(56) References Cited

OTHER PUBLICATIONS

Sven Jacobsson, Giuseppe Durisi, Mikael Coldrey, and Christoph Studer, "On Out-of-Band Emissions of Quantized Precoding in Massive MU-MIMO-OFDM", Ericsson Research, Cornell University, Dec. 4, 2017 (Year: 2017).*

Anttila, Lauri, et al., "On Antenna Array Out-of-Band Emissions", IEEE Wireless Communications Letters, vol. 8, No. 6, Dec. 2019, pp. 1653-1656.

* cited by examiner

MIMO ANTENNAS

TECHNICAL FIELD

Various example embodiments relate to wireless communications.

BACKGROUND

Wireless communication systems are under constant development. Advanced antenna technologies, for example multiple-input multiple-output, MIMO, antennas, are used to increase the capacity of a wireless connection without requiring more spectrum.

SUMMARY

According to an apparatus comprising at least one antenna array, an antenna array comprising a plurality of array elements, wherein every second element in a first direction is a digital pre-distortion-less linear element, every second element in the first direction is a non-linear element, and spacing between adjacent elements in the first direction is less than a half of a free space wavelength; at least one processor; and at least one memory including computer program code and reference information, the at least one memory and computer program code configured to, with the at least one processor, cause the apparatus at least to perform: applying a non-linear precoding to transmissions from the antenna array, the nonlinear precoding converting out-of-band emissions of the transmissions into reactive power in the near-field around the antenna array while ensuring that in-band signals generated by the elements remain unaffected; and transmitting the in-band signals from the antenna array.

In an embodiment, the spacing between adjacent elements in the first direction is equal to or less than a quarter of the free space wavelength.

In embodiments, the antenna array is a two-dimensional array comprising in a second direction elements of the same type, and spacing between adjacent elements in the second direction is equal to or greater than the half of free space wavelength.

In embodiments, the apparatus further comprises linear power amplifiers for amplifying the out-of-band signals after precoding.

In embodiments, a plurality of digital pre-distortion-less linear elements are hybrid elements, in which outputs of a first number of power amplifiers in transmissions chains are connected through phase shifters and combiners to a second number of radiating antennas, the second number being bigger than the first number.

In embodiments, the at least one memory and computer program code configured to, with the at least one processor, cause the apparatus further to perform the non-linear precoding using a result of a process comprising initializing a matrix representation of a time-domain signal generated by the non-linear elements to a constant-envelope signal closest to a zero-forcing solution and performing a predefined number of iteration rounds.

In embodiments, the at least one memory and computer program code configured to, with the at least one processor, cause the apparatus further to perform during an iteration round: selecting randomly coordinates for an element in the matrix; calculating a value for the element such that a magnitude of the value is one while other elements have fixed values by minimizing a sum of mean square errors at served apparatuses between received signals and desired signals to which a Lagrange multiplier weighting out-of-band emissions is added, is minimized, subject to constraints, one constraint ensuring that the linear elements do not transmit in in-band, another constraint limiting a power spectral density of the linear elements and still a further constraint ensuring that the signal transmitted by the non-linear elements have a constant-envelope in the time-domain; repeating the selecting and calculating until all elements have a calculated value; and updating a matrix representation of a frequency-domain signal transmitted by linear elements correspondingly.

According to an aspect there is provided a method comprising: applying a non-linear precoding to transmissions from at least one antenna array, an antenna array comprising a plurality of array elements, wherein every second element in a first direction is a digital pre-distortion-less linear element, every second element in the first direction is a non-linear element, and spacing between adjacent elements in the first direction is less than a half of a free space wavelength, the nonlinear precoding converting out-of-band emissions of the transmissions into reactive power in the near-field around the antenna array while ensuring that in-band signals generated by the elements remain unaffected; and transmitting the in-band signals from the antenna array.

In an embodiment, the method further comprises performing the nonlinear precoding using a result of a process comprising initializing a matrix representation of a time-domain signal generated by the non-linear elements to a constant-envelope signal closest to a zero-forcing solution and performing a predefined number of iteration rounds.

In an embodiment, the method further comprises performing during an iteration round following: selecting randomly coordinates for an element in the matrix; calculating a value for the element such that a magnitude of the value is one while other elements have fixed values by minimizing a sum of mean square errors at served apparatuses between received signals and desired signals to which a Lagrange multiplier weighting out-of-band emissions is added, is minimized, subject to constraints, one constraint ensuring that the linear elements do not transmit in in-band, another constraint limiting a power spectral density of the linear elements and still a further constraint ensuring that the signal transmitted by the non-linear elements have a constant-envelope in the time-domain; repeating the selecting and calculating until all elements have a calculated value; and updating a matrix representation of a frequency-domain signal transmitted by linear elements correspondingly.

According to an aspect there is provided a computer readable medium comprising program instructions stored thereon for performing at least following: applying a non-linear precoding to transmissions from at least one antenna array, an antenna array comprising a plurality of array elements, wherein every second element in a first direction is a digital pre-distortion-less linear element, every second element in the first direction is a non-linear element, and spacing between adjacent elements in the first direction is less than a half of a free space wavelength, the non-linear precoding converting out-of-band emissions of the transmissions into reactive power in the near-field around the antenna array while ensuring that in-band signals generated by the elements remain unaffected; and transmitting the in-band signals from the antenna array.

In an embodiment, the computer readable medium further comprises program instructions stored thereon for performing the non-linear precoding using a result of a process comprising initializing a matrix representation of a time-domain signal generated by the non-linear elements to a constant-envelope signal closest to a zero-forcing solution and performing a predefined number of iteration rounds.

In embodiments, the computer readable medium is a non-transitory computer readable medium.

According to an aspect there is provided a computer program comprising instructions for performing at least following: applying a non-linear precoding to transmissions from at least one antenna array, an antenna array comprising a plurality of array elements, wherein every second element in a first direction is a digital pre-distortion-less linear element, every second element in the first direction is a non-linear element, and spacing between adjacent elements in the first direction is less than a half of a free space wavelength, the non-linear precoding converting out-of-band emissions of the transmissions into reactive power in the near-field around the antenna array while ensuring that in-band signals generated by the elements remain unaffected; and transmitting the in-band signals from the antenna array.

In an embodiment, the computer program further comprises instructions for performing the non-linear precoding using a result of a process comprising initializing a matrix representation of a time-domain signal generated by the non-linear elements to a constant-envelope signal closest to a zero-forcing solution and performing a predefined number of iteration rounds.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements.

For example, a first signal could be termed a second signal, and similarly, a second signal could be also termed a first signal without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof.

Figure 1:
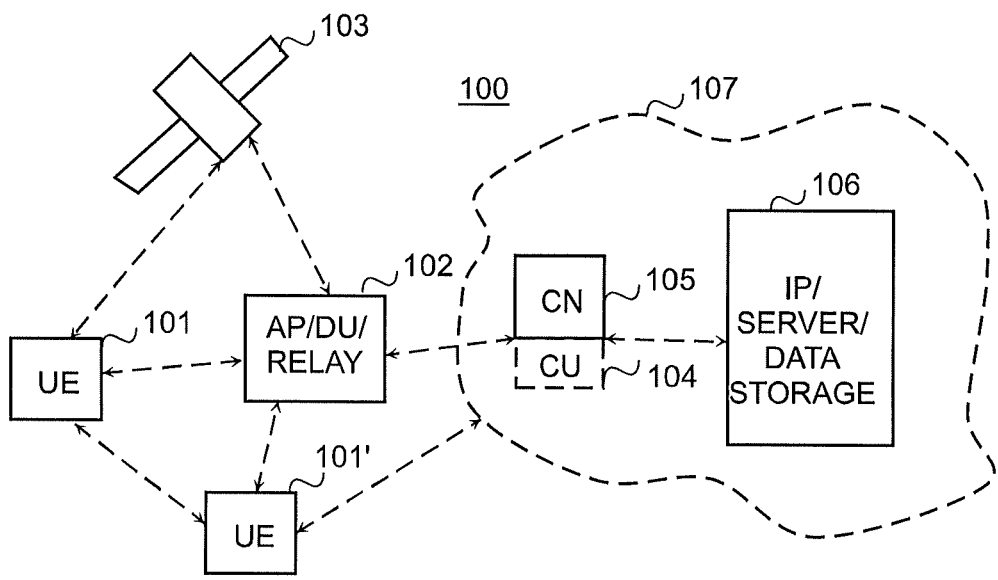
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels with a node 102. The node 102 is further connected to a core network 105. In one example, the node 102 may be an access node such as (e/g)NodeB providing or serving devices in a cell. In one example, the node 102 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The user device may also utilise cloud. In some applications, a user device may comprise a user portable device with radio parts (such as a watch, earphones, eyeglasses, other wearable accessories or wearables) and the computation is carried out in the cloud. The device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent.

Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
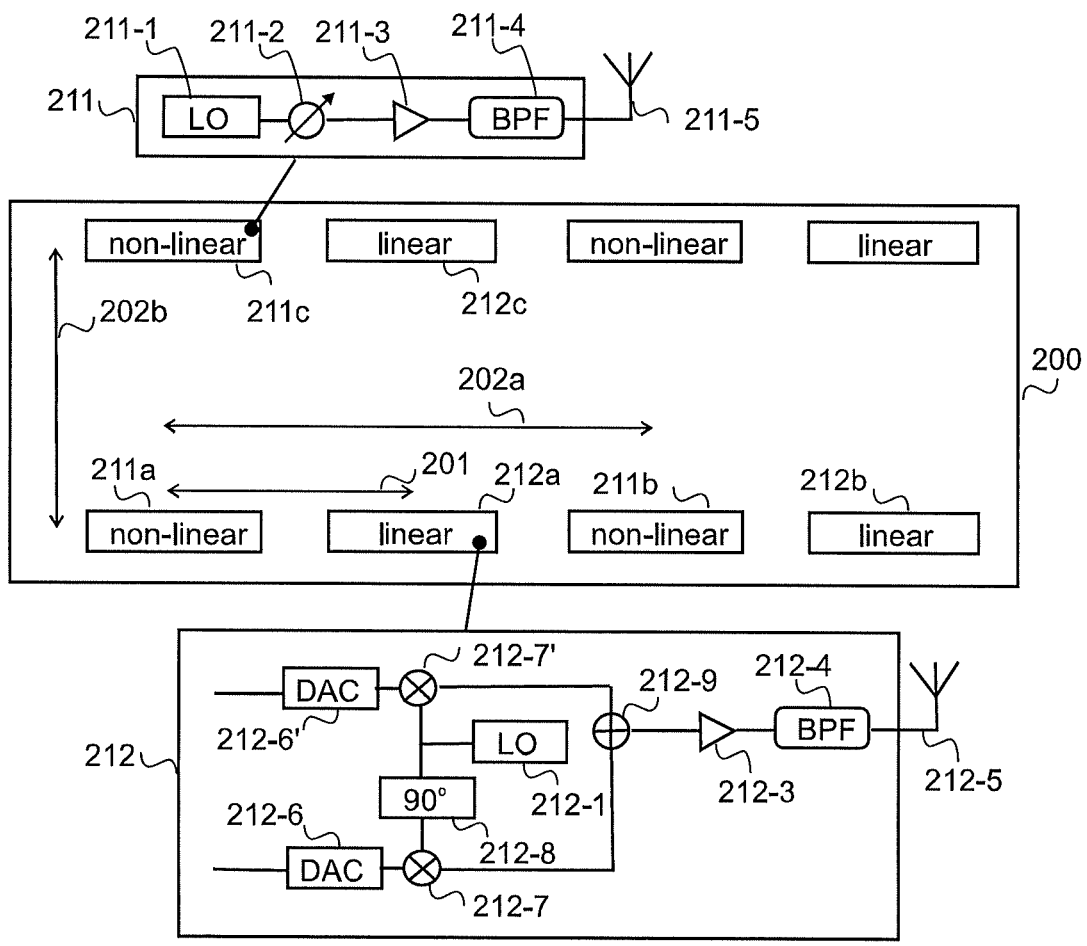
FIG. 2 illustrates an example of an array arrangement and transmission chains.

FIG. 2 is a schematic block diagram showing an example of an antenna array arrangement for a two-dimensional antenna array 200, to depict basic structure and concept on a generalized level, only for illustrative purposes. It should be appreciated that an antenna array may comprise also other elements, and comprise any number of illustrated elements. Further, an apparatus, for example a radio unit or a base station or an access node, that comprises one or more antenna arrays, may comprise also other elements, such as elements for controlling operations. The principles disclosed with the two-dimensional antenna array apply to one-dimensional antenna arrays, and their implementation is straightforward for one skilled in the art.

The antenna array 200 comprises a plurality of array elements of two different types, the types being a non-linear element 211 and a digital pre-distortion-less linear element 212, or shortly, a linear element. A non-linear element is a conventional antenna element connected to a non-linear radio frequency chain. A linear element is a conventional antenna element connected to a linear radio frequency chain. In the antenna array 200 every second element 211a, 211b in a first direction (horizontal direction in FIG. 2) is a non-linear element and every second element 212a, 212b in the first direction is a digital pre-distortion-less linear element. A spacing 201 (inter-element spacing) between adjacent elements, i.e. a spacing between a non-linear element and a digital pre-distortion-less linear element, in the first direction is less than half of a wavelength (wavelength of a radiated signal). Such a spacing causes that the adjacent antenna elements are mutually coupled. A spacing 202a (intra-element spacing) between antenna elements of the same type in the first direction is at least a sum of two consecutive inter-element spacings 201. It should be appreciated that even though in the illustrated example the elements are evenly spaced in the first direction, the elements may be non-evenly spaced, provided that the inter-element spacing is less than half of the wavelength.

In the illustrated example, the antenna array 200 comprises in the second direction (vertical direction in FIG. 2) antenna elements of the same type. In other words, in the second direction the adjacent antenna elements are either nonlinear elements 211a, 211c or digital pre-distortion-less linear elements 212a, 212c. A spacing 202b between antenna elements in the second direction is independent on the spacing in the first direction. Typically, the spacing is greater than or equal to half of the wavelength.

In an implementation, the inter-element spacing 201 is equal to or less than a quarter of the wavelength, and the elements are evenly spaced in the first direction resulting that the intra-element spacing 202a is equal to or less than half of the wavelength, and the spacing 202b in the second direction may be the same as the intra-element spacing 202a, i.e. equal to or greater than half of the wavelength. In other words, in said implementation, the antenna array 200 is upsampled in the first direction by a factor of 2.

FIG. 2 also illustrates components in transmission chains, i.e. in radio frequency chains, of the different types according to one implementation.

The transmission chain of a non-linear element 211 comprises a local oscillator (LO) 211-1, a phase modulator 211-2, for example a voltage controlled oscillator, a power amplifier 211-3, a bandpass filter (BPF) 211-4 and an antenna 211-5. The local oscillator 211-1 is connected to the phase modulator 211-2, which in turn is connected to the power amplifier 211-3. The power amplifier 211-3 is connected to the bandpass filter 211-4, to which the antenna 211-5 is connected. The power amplifier may be a non-linear power amplifier, such as a class E/F power amplifier or a linear power amplifier, such as a class AB power amplifier. The transmission chain may comprise also a power amplifier driver before the power amplifier, and/or a circulator (a radio frequency circulator) after the bandpass filter for isolating the transmitter from a receiver, even though the elements are not illustrated in FIG. 2.

In the illustrated example, the transmission chain of a digital pre-distortion-less linear element 212 comprises, for quadrature (IQ) signals digital-to-analog converters (DAC) 212-6, 212-6', one for in-phase component I and one for quadrature phase component Q, two mixers 212-7, 212-7', a phase shifter 212-8, a local oscillator (LO) 212-1, a combiner (an adder) 212-9, a power amplifier 212-3, for example a non-linear power amplifier, such as a class E/F power amplifier or a linear power amplifier, such as a class AB power amplifier, a bandpass filter 212-4 and an antenna 212-5. More precisely, there is one mixer per one converter, one 212-7' of the mixers receiving directly the output of the local oscillator 212-1, the other one 212-7 of the mixers via the phase shifter 212-8, the combiner 212-9 combining outputs of the mixers and the combined output signal is input to the power amplifier 212-3, and then filtered by the filter 212-4 before it is radiated from the antenna 212-5. Also herein, the transmission chain may further comprise a power amplifier driver before the power amplifier, and/or a circulator after the bandpass filter, even though the elements are not illustrated in FIG. 2.

In other words, the linear elements 212a, 212b, 212c do not contain digital pre-distortion elements and feedback receiver elements to linearize the power amplifier. For example, the power amplifier may be biased in a linear region. It should be appreciated that the two-dimensional antenna array 200 may comprise any number of elements in the first direction, for example 8, or 12, and any number of elements in the second direction, for example 3 or 4, without limiting solutions to the examples.

The components after the power amplifier, for example the bandpass filter 211-4, 212-4, and the antenna 211-5, 212-5 are passive and thereby linear and time-invariant. Hence, one may assume that all components after the power amplifier in a transmission chain, be the transmission chain non-linear or linear, are linear and time-invariant. Given the relationship assumption for an antenna array comprising $M_{NL}$ non-linear elements and $M_L$ linear elements, a relationship between currents and voltages at the output of power amplifiers can be expressed as:

$$v(f)=Z(f)i(f) \quad (1)$$

wherein $v(f) \in \mathbb{C}^M$ are voltages across M output antenna elements at frequency f, $i(f) \in \mathbb{C}^M$ are corresponding currents, and $Z(f) \in \mathbb{C}^{M \times M}$ is an impedance matrix $M \triangleq M_{NL}+M_L$, i.e. total number of antenna elements (non-linear and linear antenna elements)

The real part of the impedance matrix $\mathcal{R}\{Z(f)\}$ is the resistive component and the imaginary part $\mathcal{I}\{Z(f)\}$ is the reactive component. The power radiated by the antenna array is the resistive power and given as:

$$P_{rad}(f)=i^H(f)\mathcal{R}\{Z(f)\}i(f) \quad (2)$$

wherein $P_{rad}(f)$ is the power radiated, and $\mathcal{R}\{Z(f)\}$ is the resistive component.

Because of mutual coupling, the real part of the $M_L+M_{NL}$ dimensional impedance matrix has the following interesting mathematical property:

$$\text{rank}(\mathcal{R}\{Z(f)\}) \approx M_{NL}$$

In other words, the matrix $\mathcal{R}\{Z(f)\}$ is rank deficient and has a $M_L$ dimensional null-space. This means that currents in the out-of-band emission frequencies can be selected so that the radiated power in out-of-band emission frequencies can be made 0, i.e., i(f) can be selected such that:

$$P_{rad}(f)=i^H(f)\mathcal{R}\{Z(f)\}i(f)=0, \forall f \in \text{out-of-band frequencies}$$

In essence, all the power at the out-of-band frequencies is converted to the reactive power in the near-field around the antenna array and not dissipated, thereby reducing the out-of-band emissions. However, since the currents from the linear transmission chains in the in-band frequencies are zero, the mutual coupling does not impact the radiated power in in-band frequencies.

Figure 3:
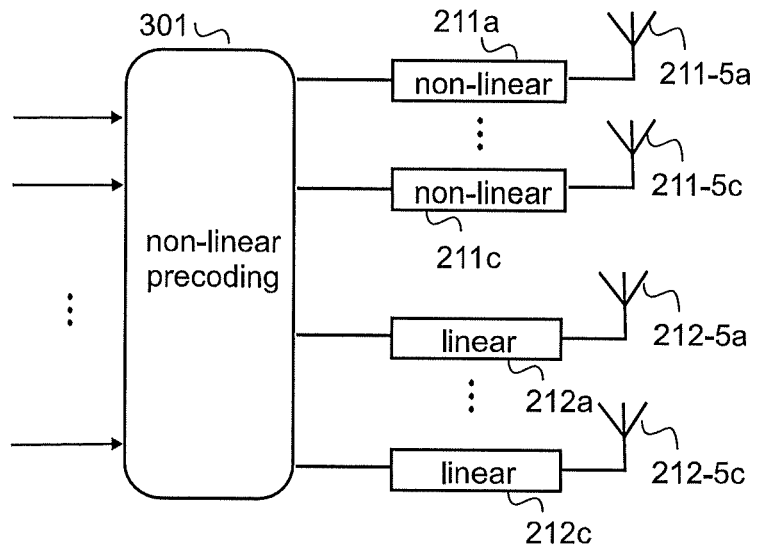
FIG. 3 illustrates the array arrangement in another view angle.

FIG. 3 illustrates the antenna array arrangement, or shortly the antenna array, of FIG. 2 in another view angle.

Referring to FIG. 3, the antenna array comprises a shared non-linear precoder element 301, which converts out-of-band emissions generated by the non-linear elements 211a, 211c into reactive power, as will be described in more detail below with FIGS. 6 and 7.

Figure 4:
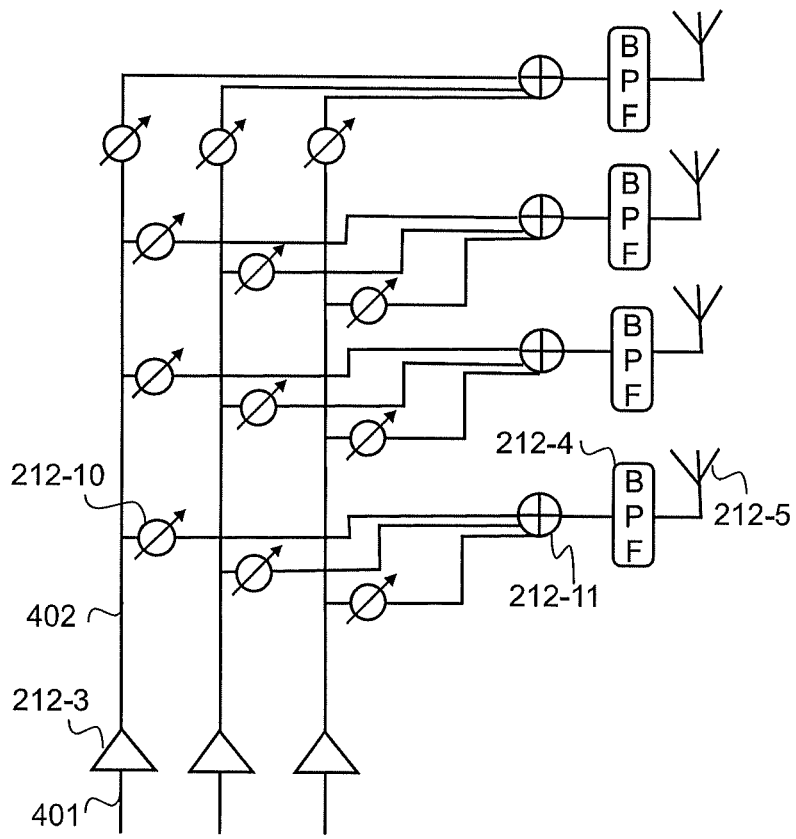
FIG. 4 illustrates an example of a hybrid linear transmit chain.

FIG. 4 illustrates an alternative implementation of transmission chains (radio frequency chains) of the linear elements than the one illustrated by chain 212 with FIG. 2. The alternative solution is based on a hybrid arrangement in which a plurality of linear elements are driven by a single transmission chain through phase shifters (radio frequency phase shifters).

In the example illustrated in FIG. 4, components before power amplifiers are not illustrated, but it is assumed that a power amplifier 212-3 receives an output 401 from the combiner (not illustrated in FIG. 4, illustrated in FIG. 2 by 212-9). In the illustrated example, four radiating antennas are fed via three power amplifiers 212-3. One output 402 from one power amplifier 212-3 is forwarded to four phase shifters 212-10 to be phase-shifted. A phase shifter output is input to a combiner 212-11 in such a way that one phase-shifted output per a power amplifier is fed to the combiner 212-11 which combines three phase-shifted outputs. The combined output is then input, via the bandpass filter 212-4, to the antenna 212-5 to be radiated. More precisely, in the illustrated example, for one linear element, per an amplified output 402, the output is phase-shifted, and three phase-shifted outputs, originating from different amplified outputs, are combined. In a more generalized level, there is a first number of power amplifiers, a second number of antennas, a second number of combiners, and a third number of phase shifters, the second number being bigger than the first number, and the third number being a product of the first number and the second number. In other words, an output of a power amplifier is connected in parallel to the second number of phase shifters, and a phase shifter output is connected to a combiner in such a way that the combiner combines the first number or phase shifted outputs, one phase shifted output per a power amplifier.

Figure 5:
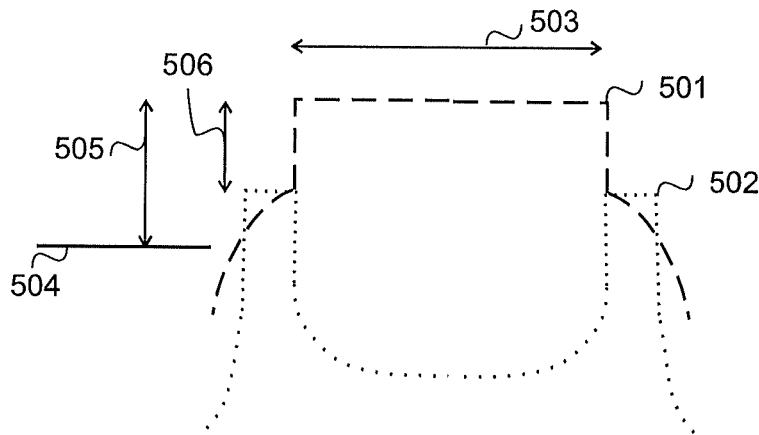
FIG. 5 illustrates a power spectral density.

FIG. 5 illustrates a power spectral density of an antenna array comprising the linear and non-linear antenna elements according to the examples described above.

Referring to FIG. 5, a power spectral density 501 of non-linear elements is depicted by a hashed line, and a power spectral density 502 of digital predistortion-less linear elements is depicted by a dotted line. In FIG. 5, the system bandwidth, i.e. in-band, is indicated by arrow-headed line 503, and a spectral mask 504 is depicted by its starting portion, for the sake of clarity of the Figure. The spectral mask would continue on the start level until it would go up an amount 505 at the beginning of the system bandwidth, and it would go down the amount 505 at the end of the system bandwidth and continue therefrom on the start level. In case a start level is zero, the amount 505 depicts in-band transmission power level.

The power spectral density 501 of the non-linear elements has shoulders on the out-of-band area (i.e. area not within the system band 503), the shoulders being the generated out-of-band emissions. From the power spectral density 502 of the digital pre-distortion-less linear elements it can be seen that the linear elements transmit only in the out-of-band region and at the same power level as the out-of-band emissions from the non-linear elements are transmitted. For example, if the in-band transmission level is 45 dB, the out-of-band transmission level is about 15 dB, i.e. about 30 dB lower, as illustrated by amount 506, than the inband transmission power level. Since the transmit power of the linear elements is small, power efficiency of the power amplifiers in the transmitting chains of linear elements may be small. Hence, the class AB power amplifiers can be used.

Figure 6:
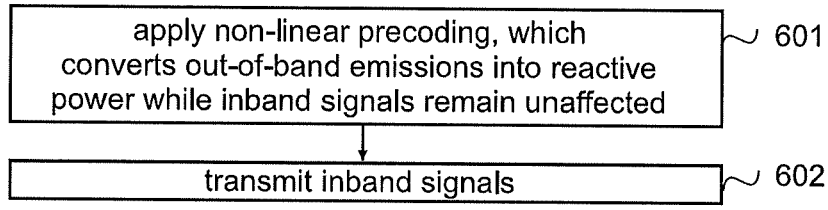
FIGS. 6, 7 and 8 are flow charts illustrating functionalities.

FIG. 6 is a flowchart of a functionality performed by an antenna array (antenna array arrangement) comprising the linear and non-linear elements as described above, or by an apparatus comprising one or more such antenna arrays to ensure that the in-band signal is unaffected and radiated from the antenna array(s) with maximum efficiency.

Referring to FIG. 6, a non-linear precoding is applied in block 601 to transmissions from the antenna array, the non-linear precoding converting out-of-band emissions of the transmissions into reactive power in the near-field around in the antenna array and not dissipated while ensuring that in-band signals generated by the elements, or as can be seen from FIG. 5, in-band signals generated by the non-linear elements, remain unaffected. The in-band signals are then transmitted (radiated) in block 602 from the antenna array.

Figure 7:
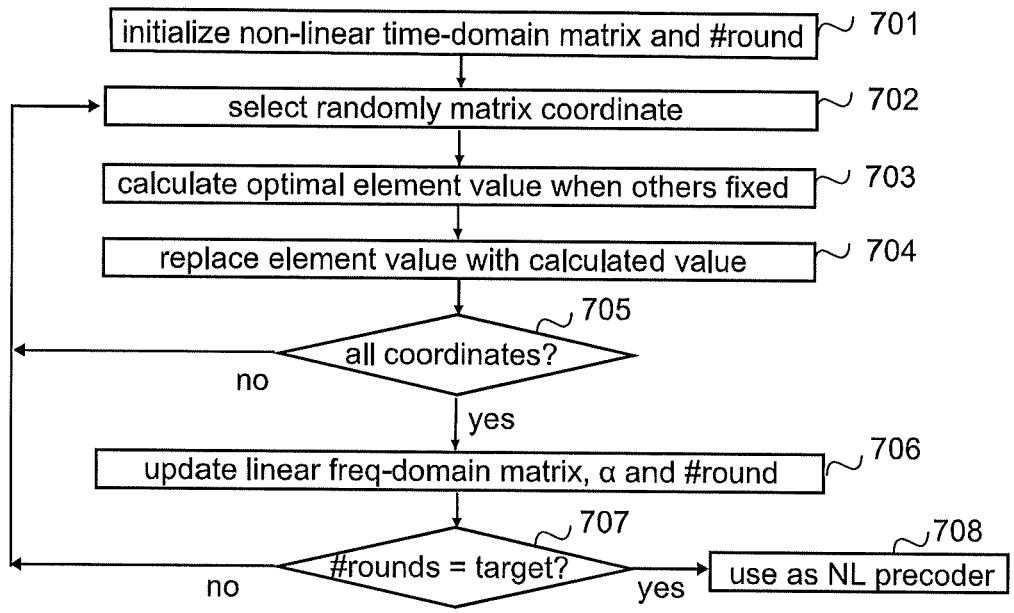

FIG. 7 illustrates an example of how to obtain a non-linear precoding algorithm for a non-linear precoder, i.e. an algorithm that can be used in block 601 in FIG. 6. The obtained example of a non-linear precoding algorithm is based on the assumption that all components after the power amplifier in a transmission chain, be the transmission chain non-linear or linear, are linear and time-invariant, as discussed with FIG. 2. The non-linear precoding algorithm illustrated in FIG. 7 utilizes a greedy coordinate descent solving the Lagrangian of an optimization problem to determine currents i(f) so that the radiated power in out-of-band frequencies is zero.

Assuming that K devices are served using an antenna array, which comprises $M_{NL}$ non-linear elements and $M_L$ linear elements and which transmits a signal, for example an orthogonal frequency-division multiplexing (OFDM) signal, using N subcarriers, with $N_U$ occupied subcarriers and $N_Z$ empty subcarriers resulting in oversampling ratio of $N/N_U$, the optimization problem may be expressed as follows:

$$A^{opt}, E^{opt} = \arg \min_{\alpha>0,A,E} \sum_{n=0}^{N-1} \left\| u[n] - \alpha \sum_{\ell=0}^{L-1} H[\ell]a[n-\ell] \right\|_F^2$$

subject to $X = AF$ $e[n] = 0 \ \forall n \in \mathcal{N}_u$ $\left[ x^H[n], e^H[n] \right] C \begin{bmatrix} x[n] \\ e[n] \end{bmatrix} \leq \epsilon \ \forall n \in \mathcal{N}_z$ $\|e[n]\|^2 \leq \eta \ \forall n \in \mathcal{N}_z$ $|a_{mn}| = 1 \ \forall 1 \leq m \leq M_{NL}, 1 \leq n \leq N$ wherein $A \in \mathbb{C}^{M_{NL} \times N}$ and is a matrix representation of a time-domain signal generated by the non-linear elements, $E \in \mathbb{C}^{M_L \times N}$ is a matrix representation of a frequency-domain signal transmitted by linear elements, $u[n] \in \mathbb{C}^K$ is the time-domain of the signal transmitted, $H[\ell] \in \mathbb{C}^{K \times M_{NL}}$ is the channel between the $M_{NL}$ non-linear elements and the K devices, $X \in \mathbb{C}^{M_{NL} \times N}$ is a matrix representation of a frequency-domain signal generated by the non-linear elements, e[n] is the $n^{th}$ column of the matrix E, x[n] is the $n^{th}$ column of the matrix X, $F \in \mathbb{C}^{N \times N}$ is the discrete-Fourier transform (DFT) matrix, α[n] is the $n^{th}$ column of the matrix A, $\alpha_{mn}$ is the $(m,n)^{th}$ element of the matrix A N=a total number of subcarriers (including the zero and the used subcarriers, L is a number of samples of the channel impulse response, and α is a factor.

The firstly mentioned constraint the optimization problem is subject to, i.e. X=AF, relates the time and frequency-domain signals transmitted by the nonlinear elements. The second constraint, i.e. $e[n]=0 \forall n \in \mathcal{N}_u$, ensures that the linear elements do not transmit in in-band. The third constraint limits the out-of-band (OOB) emissions over the subcarriers in $\mathcal{N}_z$ to less than e. The fourth constraint, i.e. $\|e[n]\|^2 \leq \eta \forall n \in \mathcal{N}_z$, limits a power spectral density of the linear elements to less than η. The last constraint, i.e. $|[A]_{mn}|=1 \ \forall m, n$, ensures that the signal transmitted by the non-linear elements have a constant-envelope in the time-domain.

The Lagrangian of the above optimization problem is following:

$$A^{opt}, E^{opt} = \arg \min_{\alpha>0,A,E} \sum_{n=0}^{N-1} \left\| u[n] - \alpha \sum_{\ell=0}^{L-1} H[\ell]a[n-\ell] \right\|_F^2 + \lambda_{OOB} \sum_{n \in N_z} \left\{ \left[ x^H[n], e^H[n] \right] C \begin{bmatrix} x[n] \\ e[n] \end{bmatrix} \right\}$$

subject to $e[n] = 0 \ \forall n \in \mathcal{N}_u$ $\|e[n]\|^2 \leq \eta \ \forall n \in \mathcal{N}_z$ $|a_{mn}| = 1 \ \forall 1 \leq m \leq M_{NL}, 1 \leq n \leq N$ wherein $\lambda_{OOB}$ is the Lagrange multiplier that weights the out-of-band (OOB) emissions, and its value may be freely set.

The above Langrangian of the optimization problem is then used for determining a non-linear precoding algorithm, as said above, by repeating a predefined number of iteration rounds described with FIG. 7. In other words, a sum of mean square errors at served apparatuses between received signals and desired signals, i.e. optimal signals, to which a Lagrange multiplier weighting out-of-band emissions is added, is minimized, subject to constraints, one constraint ensuring that the linear elements do not transmit in in-band, another constraint limiting a power spectral density of the linear elements and still a further constraint ensuring that the signal transmitted by the non-linear elements have a constant-envelope in the time-domain.

Referring to FIG. 7, a matrix representation of a time-domain signal generated by the non-linear elements, i.e. A, is initialized in block 701 to a constant-envelope signal closest to a zero-forcing solution. Further, in the illustrated example, also an iteration round calculator, #round, is initialized in block 701 to zero. However, it should be appreciated that any other way to track the number of iteration rounds may be used. After that the iteration rounds are performed. An iteration round starts by selecting in block 702 randomly a coordinate (m, n) amongst matrix coordinates of the matrix A not yet selected during the current iteration round. In another implementation, the coordinate may be selected amongst matrix coordinates regardless whether or not they have been selected earlier during the current iteration round.

Then an optimal value of a an element $a_{mn}$, which is the $(m, n)^{th}$ element of the matrix A, is calculated in block 703 such that the magnitude of the element is one when all other elements in the matrix A have fixed values (the initial values, or values calculated during iterations), using the above described optimization problem. Then the element value of the element $a_{mn}$ in the matrix A is replaced in block 704 with the value calculated in block 703. Then it is checked in block 705, whether all coordinates of the matrix A have undergone blocks 703 and 704 during the current iteration round. If not (block 705: no), the process returns to block 702 to randomly select a coordinate.

When all coordinates of the matrix A have undergone blocks 703 and 704 during the current iteration round (block 705: yes), then the matrix representation E of a frequency-domain signal transmitted by linear elements and a are updated in block 706. The matrix representation E is initialized to zero, and when updated, the above optimization problem is solved for e[n]s by keeping x[n]s and the matrix A fixed. Further, in the illustrated example also the iteration round calculator, #round, is updated by incrementing its value by one. Then it is checked in block 707 whether the number of iterations rounds, indicated by the iteration round calculator, is the same as a preset target number of the iteration rounds. The preset target number may be freely set, the bigger the value, the longer it take to determine the non-linear precoding algorithm but the more accurate it will be. An accurate enough precoding algorithm, allowing real-time use, may be obtained by performing 10 or 20 iteration rounds, for example.

If the number of iteration round is not yet the target number of iteration rounds (block 707: no), the process starts another iteration round and returns to block 702 to randomly select a coordinate. If the target number of iteration rounds is performed (block 707: yes), the thus obtained solution can be used (block 708) as the non-linear precoder (the non-linear precoding algorithm).

Figure 8:
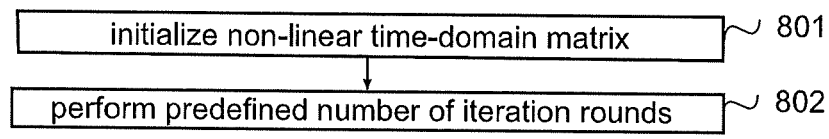

The an example of how to obtain a non-linear precoding algorithm for a non-linear precoder, i.e. an algorithm that can be used in block 601 in FIG. 6 illustrated in FIG. 7 describes one very specific way. FIG. 8 illustrates a more general approach how to obtain a non-linear precoding algorithm.

Referring to FIG. 8, a matrix representation of a time-domain signal generated by the non-linear elements, i.e. A, is initialized in block 801 to a constant-envelope signal closest to a zero-forcing solution. Then a predefined number of iteration rounds are performed in block 802, resulting to an algorithm that can be used in block 601.

Figure 9:
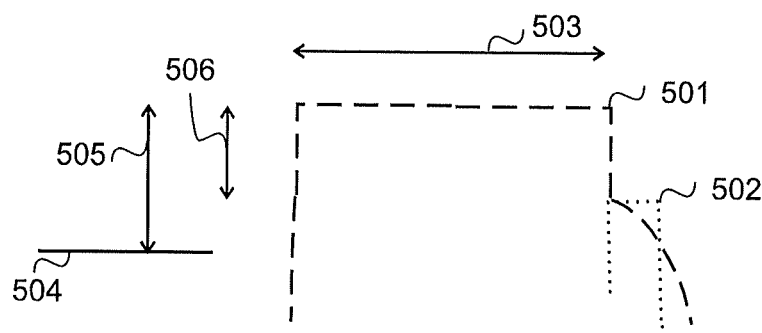
FIG. 9 illustrates another power spectral density.

By changing the sets of used subcarriers $N_u$ and empty subcarriers $N_z$, it is possible to adjust the non-linear precoding algorithm to have a wider operation bandwidth or smaller operation bandwidth, also including out-of-band emissions, by setting the sets so that the signal generated by the non-linear elements is such that the out-of-band emissions are one-sided with respect to the system bandwidth, as illustrated in FIG. 9. FIG. 9 uses the same reference numbers as FIG. 5. FIG. 9 differs from FIG. 5 in that respect that the power spectral density 501 of the non-linear and linear transmission chains are one sided, having out-of band emissions on the right side of the system bandwidth 503. In such a solution the operating bandwidth of the linear elements then can be one-sided over the out-of-band emissions, to allow the linear transmission chains to be limited to a small bandwidth, in the illustrated example over the out-of-band emissions. A non-limiting example relating to sets of used and empty subcarriers includes that if N=64, one set with a wider operation band may be $N_u=\{17, \ldots, 48\}$ and $N_z=\{1, \ldots, 16, 49, \ldots, 64\}$, and another set with a smaller operation band changed may be $N_u=\{1, \ldots, 32\}$ and $N_z=\{33, \ldots, 64\}$.

The blocks and related functions described above by means of FIGS. 2 to 9 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 10:
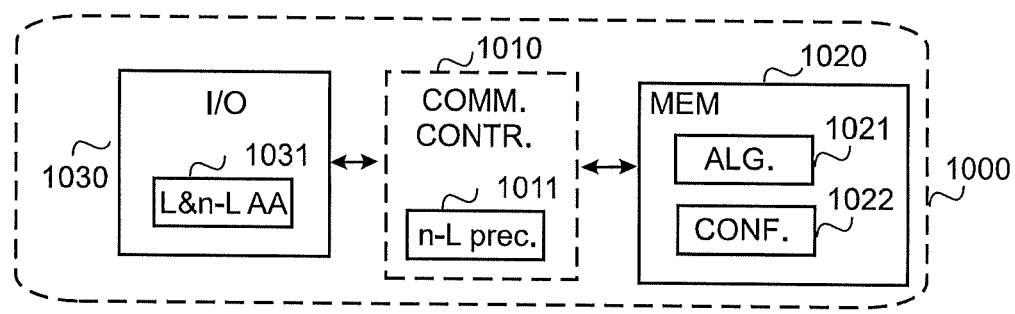
FIG. 10 is a schematic block diagram.

FIG. 10 illustrates an apparatus 1000 comprising means for carrying out any one of the embodiments/examples/implementations described above. The apparatus may comprise at least one processor or processing circuitry, and at least one memory 1020 including a computer program code (software, algorithm) ALG. 1021, wherein the at least one memory and the computer program code (software, algorithm) are configured, with the at least one processor, to cause the apparatus to carry out any one of the embodiments, examples and implementations described above. The apparatus 1000 may be an electronic device, for example a network apparatus, a user equipment, a radio unit, a base station, an access node, or a terminal device in a vehicle, other examples being listed above with FIG. 1. The at least one processor or a processing circuitry may realize a communication controller 1010 controlling communications in a radio interface.

The apparatus 1000 may further comprise an application processor (not shown) executing one or more computer program applications that generate a need to transmit and/or receive data through the communication controller 1010. The application processor may form an application layer of the apparatus. The application processor may execute computer programs forming the primary function of the apparatus. For example, if the apparatus is a computer system of a vehicle, the application processor may execute a media application and/or an autonomous driving and navigation application.

Referring to FIG. 10, the memory 1020 may be implemented using any suitable data storage technology, such as semiconductor based memory devices, flash memory, magnetic memory devices and systems, optical memory devices and systems, fixed memory and removable memory. The memory may comprise a configuration storage CONF. 1021, such as a configuration database, for storing configuration parameters, e.g. for the non-linear precoding algorithm. The memory 1020 may further store other data, such as a data buffer for data waiting to be processed (including transmission).

Referring to FIG. 10, the apparatus comprises a communication interface 1030 comprising hardware and/or software for realizing communication connectivity according to one or more wireless and/or wired communication protocols. The communication interface 1030 provides the apparatus with radio communication capabilities. The communication interface 1030 comprises one or more antenna arrangements with linear and non-linear elements (L&n-L AA) 1031 according to any one of the embodiments/examples/implementations described above, and it may comprise other standard well-known components. Digital signal processing regarding transmission and reception of signals may be performed in a communication controller 1010. The communication controller 1010 comprises a non-linear precoding circuitry 1011 (n-L prec.) configured to apply non-linear precoding for transmissions according to any one of the embodiments/examples/implementations described above. The communication controller 1010 may control the non-linear precoding circuitry 1011.

In an embodiment, at least some of the functionalities of the apparatus of FIG. 10 may be shared between two physically separate devices, for example between a radio unit and or a radio head and corresponding counter-party, for example a distributed unit, forming one operational entity. Therefore, the apparatus may be seen to depict the operational entity comprising one or more physically separate devices for comprising an antenna arrangement described and/or for executing at least some of the processes described.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 9 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:
1. An apparatus, comprising:
at least one antenna array, the at least one antenna array comprising a plurality of array elements, wherein every other element in a first direction starting from a second element is a digital pre-distortion-less linear element, every other element in the first direction starting from a first element is a non-linear element, and spacing between adjacent elements in the first direction is less than a half of a free space wavelength;

at least one processor; and at least one non-transitory memory storing instructions that, when executed with the at least one processor, cause the apparatus at least to perform:

applying a non-linear precoding to transmissions from the at least one antenna array, the non-linear precoding converting out-of-band emissions of the transmissions into reactive power in a near-field around the at least one antenna array while ensuring that in-band signals generated with the elements remain unaffected; and transmitting the in-band signals from the at least one antenna array.

2. The apparatus of claim 1, wherein the spacing between adjacent elements in the first direction is equal to or less than a quarter of the free space wavelength.

3. The apparatus of claim 1, wherein the at least one antenna array is a two-dimensional array comprising in a second direction elements of the same type, and spacing between adjacent elements in the second direction is equal to or greater than the half of free space wavelength.

4. The apparatus of claim 1, wherein the apparatus further comprises linear power amplifiers for amplifying the out-of-band emission after the non-linear precoding.

5. The apparatus of claim 1, wherein a plurality of digital pre-distortion-less linear elements are hybrid elements, in which outputs of a first number of power amplifiers in transmissions chains are connected through phase shifters and combiners to a second number of radiating antennas, the second number being bigger than the first number.

6. The apparatus of claim 1, wherein the instructions, when executed with the at least one processor, cause the apparatus further to perform the non-linear precoding using a result of a process comprising initializing a matrix representation of a time-domain signal generated with the non-linear elements to a constant-envelope signal closest to a zero-forcing solution and performing a predefined number of iteration rounds.

7. The apparatus of claim 6, wherein the instructions, when executed with the at least one processor, cause the apparatus further to perform during an iteration round:

selecting randomly coordinates for an element in the matrix;

calculating a value for the element such that a magnitude of the value is one while other elements have fixed values with minimizing a sum of mean square errors at served apparatuses between received signals and desired signals to which a Lagrange multiplier weighting the out-of-band emissions is added is minimized, subject to constraints, one constraint ensuring that the linear elements do not transmit in in-band, another constraint limiting a power spectral density of the linear elements, and still a further constraint ensuring that the signal transmitted with the non-linear elements have a constant-envelope in the time-domain;

repeating the selecting and calculating until all elements have a calculated value; and updating a matrix representation of a frequency-domain signal transmitted with the linear elements correspondingly.

8. A method comprising:

applying a non-linear precoding to transmissions from at least one antenna array, the at least one antenna array comprising a plurality of array elements, wherein every other element in a first direction starting from a second element is a digital pre-distortion-less linear element, every other element in the first direction starting from a first element is a non-linear element, and spacing between adjacent elements in the first direction is less than a half of a free space wavelength, the non-linear precoding converting out-of-band emissions of the transmissions into reactive power in the near-field around the at least one antenna array while ensuring that in-band signals generated with the elements remain unaffected; and transmitting the in-band signals from the at least one antenna array.

9. The method of claim 8, further comprising:

performing the non-linear precoding using a result of a process comprising initializing a matrix representation of a time-domain signal generated with the non-linear elements to a constant-envelope signal closest to a zero-forcing solution and performing a predefined number of iteration rounds.

10. The method of claim 9, further comprising performing during an iteration round following:

selecting randomly coordinates for an element in the matrix;

calculating a value for the element such that a magnitude of the value is one while other elements have fixed values with minimizing a sum of mean square errors at served apparatuses between received signals and desired signals to which a Lagrange multiplier weighting out-of-band emissions is added, is minimized, subject to constraints, one constraint ensuring that the linear elements do not transmit in in-band, another constraint limiting a power spectral density of the linear elements and still a further constraint ensuring that the signal transmitted with the non-linear elements have a constant-envelope in the time-domain;

repeating the selecting and calculating until all elements have a calculated value; and updating a matrix representation of a frequency-domain signal transmitted with the linear elements correspondingly.

11. A non-transitory program storage device readable by an apparatus tangibly embodying a program of instructions executable with the apparatus for performing at least following:

applying a non-linear precoding to transmissions from at least one antenna array, the at least one antenna array comprising a plurality of array elements, wherein every other element in a first direction starting from a second element is a digital pre-distortion-less linear element, every other element in the first direction starting from a first element is a non-linear element, and spacing between adjacent elements in the first direction is less than a half of a free space wavelength, the non-linear precoding converting out-of-band emissions of the transmissions into reactive power in the near-field around the at least one antenna array while ensuring that in-band signals generated with the elements remain unaffected; and transmitting the in-band signals from the at least one antenna array.

12. The non-transitory program storage device of claim 11, the non-transitory program storage device readable by an apparatus tangibly embodying a program of instructions executable with the apparatus for performing the non-linear precoding using a result of a process comprising initializing a matrix representation of a time-domain signal generated with the non-linear elements to a constant-envelope signal closest to a zero-forcing solution and performing a predefined number of iteration rounds.

* * * * *